US008337381B2

(12) United States Patent
Tasara et al.

(10) Patent No.: US 8,337,381 B2
(45) Date of Patent: Dec. 25, 2012

(54) DISPOSAL PROCESS FOR RESIDENTIAL SOLID WASTE

(76) Inventors: Eduardo Masalleras Tasara, Santiago (CL); Daniel Zamudio Fevrier, Santiago (CL); Jose Alberto Ochoa Disselkoen, legal representative, Santiago (CL)

(*) Notice: Subject to any disclaimer, the term of this patent is extended or adjusted under 35 U.S.C. 154(b) by 717 days.

(21) Appl. No.: 12/311,237

(22) PCT Filed: Sep. 19, 2007

(86) PCT No.: PCT/US2007/020414
§ 371 (c)(1),
(2), (4) Date: Mar. 20, 2009

(87) PCT Pub. No.: WO2012/311237
PCT Pub. Date: Dec. 8, 2004

(65) Prior Publication Data
US 2010/0179369 A1      Jul. 15, 2010

(30) Foreign Application Priority Data

Sep. 22, 2006    (CL) .................................. 02530-2006

(51) Int. Cl.
*C03B 5/00* (2006.01)
(52) U.S. Cl. ....................................... 588/253; 210/749
(58) Field of Classification Search .................. 588/252, 588/253, 405; 210/749
See application file for complete search history.

(56) References Cited

U.S. PATENT DOCUMENTS 7,387,674 B1 *   6/2008   Yi ................................ 106/669

\* cited by examiner

*Primary Examiner* — Edward Johnson
(74) *Attorney, Agent, or Firm* — Ballew Law

(57) ABSTRACT

Industrial process for the treatment of RSW (residential solid waste) after being milled is processed with sanitizing solutions, and binders and hardeners, which chemically immobilize and avoid the production of percolating liquids, leaching of heavy metals and generation of greenhouse gases. The resulting material is a grey, warm and malleable paste that is moldable, allowing diverse uses. The material can be directly buried in the ground without special protections; can be used as construction material for urban furniture or architectural structures; or can be anchored in the ocean, building habitats of ocean ecosystems, if it is properly packaged in waterproof material.

12 Claims, No Drawings

DISPOSAL PROCESS FOR RESIDENTIAL SOLID WASTE

BACKGROUND

From the beginning, communities have tried to resolve the problem regarding the disposal of the Residential Solid Waste (RSW). At first, the treatment methods consisted of the application of highly poor and rudimentary systems, essentially consisting of open dumps, emptying into the ocean, composting and, finally sanitary landfills where the mentioned RSW is accumulated forming a critical dangerous mass, with the consequent problems coming from the natural leaching of the percolated liquids into the groundwater, toxic gas emission such as methane, carbon dioxide and mercaptans resulting from aerobic and anaerobic fermentation of the material contained in the waste and the proliferation of infectious vectors, such as dogs, birds, rodents and other animals that can feed themselves with the waste present at the open dumps.

Subsequently, in Europe and United States of America the need of more complex treatments was imposed as integral solution for the RSW disposal problem. The previous waste pyrolysis and thermogenesis techniques can be mentioned among the most outstanding industrialized processes, which present interesting environmental results, but of great economic cost. Notwithstanding, the waste pyrolysis and thermogenesis processes have the inconvenient of generating an important amount of risky components such as dioxins, carbon dioxide and methane, besides presenting a huge investing cost at the waste combustion stations, which makes it difficult to install such plants in the countries less developed.

Recently and faced to the proximity of new technical environmental demands compelled by the international agreements, it is necessary to design new technological systems and processes based on the compression of the critical RSW mass, the sanitization or disposal of the resulting liquids and the subsequent treatment of the remaining solids.

A system known in the previous art is the Davis and Trash Method, consisting of the compression and sanitization process of solids and liquids with gaseous chlorine as sanitizing agent, where a compression at a 40 kg/cm2 pressure must be performed in the first 72 hours after collecting the RSW. The gaseous chlorine must be injected during the compression stage of the RSW and the evacuated liquids may be spilled into the sewerage system. On the other hand, the dry, inert and bacteria free solids may be disposed in a sanitary landfill, reducing the weight and volume of the initial values with a comparative advantage of approximately 50%. This process has the disadvantage of generating organochlorine compounds, which are highly toxic, being necessary to wash and recover them previously eliminating the steam of the atmosphere.

Another system of the previous art is the one known as Rotomat System, which includes a Huber equipment for separating liquids from solids, pressing and washing the integrated waste, with functions of grinding, washing, extracting, dehydrating, and pressing. The liquids are treated and sanitized through a reverse osmosis, the solids being eliminated in conventional sanitary landfills.

The previous art also shows the process developed by researcher J. M. Baldasan through which no previous treatment of the disposed domestic garbage or of the liquids evacuated is performed. This is due to the fact of proving that such liquids present a lower level of pollution compared with the residential effluents, reason for which they could perfectly be evacuated into the drain pipe or the sewer system and because there is no generation of bacterium of the liquids within the first hours.

For minor communities, the method known as COMPOST could be a good answer to the problem, consisting of the same biological process which performs a decomposition of the contained organic material, such as fruits, green vegetables or vegetables, among others, generating a compost that can be destined to improve the quality of the lands, considering that it is very rich in nutrients. The technique consists of collecting the spare organic material and daily air it, covering it with dry leaves, sawdust, straw or dry grass, in a so-called composter, surface asphalted with side chutes. Layer to layer, the covered organic spares and with the aerobic action of the microorganisms, become leaf mold after several weeks, with fragrance characteristics similar to a wooded soil. Its about a disposal method adapted at a lower level, but not at the level of a particular country or city, being useful as a partial solution for the organic material, but contributing to relieve in some way the index of 1.2 kg of residential waste per person per day.

Other waste disposal processes are described in the Chilean patent applications CL 1143—2001, submitted by the firm DER GRUNE PUNKT—DUALES SYSTEM DEUTSCHLAND AG, with the priority DE 10024309.6, CL 464—1994, submitted by the firm EVERGREEN GLOBAL RESOURCES, INC, with the priority U.S. Ser. No. 08/200,782, and the CL 1412—1999 application, of ERNESTO DE LA CONCHA ESTRADA. Particularly, the document CL 1143—2001, describes a procedure for the dry separation of garbage with plastic material containers waste made up of specific polymers. The CL 465—1994 patent application, describes a procedure of three stages for treating the solid waste and avoid its inherent risks, with recovery of the metallic and energetic useful components, through stages of mechanic and chemical processing. Finally, the CL 1412—1999 patent application describes a method destined to previously select the recyclable garbage and the non-recyclable metals.

DESCRIPTIVE REPORT

The Residential Solid Waste Industrial Treatment (RSWIT) process for its final disposal in land or ocean consists of three stages:

The first stage is an industrial treatment of blanketing; the second and third stages are alternatives. The second stage is of land disposal or its use as construction material and the third stage is the final disposal in the ocean as an option.

$1^{st}$ Stage: Residential Solid Waste Industrial Treatment (RSW). The Residential Solid Waste is received directly from the collector truck in a hopper with a bag breaker. Then, it goes through a conveyor belt from the bag breaker to a rotating mill with sieves that generate particles from 2 to 25 mm. It is possible either to remove some elements which are considered valuable as aluminum, glass, paper or others, or not without this meaning to alter the process. A solid mass in semi-dry condition is obtained from the milling, which through another conveyor belt is taken to a homogenizer where sanitizing solutions are applied, which may include ultraviolet radiation, ozonification, chlorination, oxygenated water, quicklime and others; then stabilizer, binders and hardeners are added, which may include carbonate calcium, hydroxide calcium, cement, plaster, bentonite or others in proportions from 5 to 25%.

Water is added to the RSW in proportions from 5 to 8% of its weight according to how much is needed in order to form a warm, doughy and malleable mass. The water is added to the RSW to improve and facilitate its mixing with the binders, hardeners and sanitizing solutions.

The retention of liquids is produced by absorption of papers and cardboards and by absorption to smooth surfaces of plastics, cans and other components of the RSW; surfaces that have been to a large extent released during the milling process and subsequent mixing. After that, the calcium oxide reacts with the water forming calcium hydroxide that in a sequential process captures the carbonate dioxide generated by the RSW and stabilized as calcium carbonate.

This mass is deposited in molds and put to dry outdoors, in sun ovens or others, with air forced by electric industrial fans, or wind tunnels. A hard, sand color and slightly fluffy mass is obtained. This process retains all the liquids naturally contained in the RSW.

The non-selected RSW, grinded and put through this industrial process becomes absolutely inert, obtaining a different product from garbage, DRUX, as shown by the results of biological and dangerousness analyses, which are included in the annex, performed by CESMEC.

These dangerousness analyses performed by CESMEC regarding the DRUX, allow proving that it has no dangerousness characteristic indicated in the DS 148/04 of the Health Department of Chile. Thus, the possibility of these generating dangerous leachates that pollute the water or generating greenhouse gases is ruled out.

Bricks elaborated on Mar. 18, 2005 and other elaborated on Dec. 5, 2005 were analyzed.

The first (Chemical Analysis Report SQC—13794, Sample N° 7896) was sampled starting from 28 that were elaborated between January and July of 2005. A sample of 8 bricks was taken at random from these 28. From these non identified ones, one was selected and sent to CESMEC.

The second (Chemical Analysis Report SQC—13795, Sample N° 7917) was sampled at random among 15 bricks elaborated between the end of November and beginning of December of 2005. From these 15 bricks, 2 of them were sampled and sent to CESMEC Santiago, one of them, at random, was analyzed.

The performed analyses are the following:

Toxicity Analysis: the characteristic toxicity elements were determined (organic compounds) through TCLP Test.

Leaching Waste-Process in order to determine mobility of toxic organic and inorganic analytes applying NCH 2754 Of 2003, through TCLP Test—EPA 1311.

Reactivity, measured through the release of sulphydric acid (EPA 9030 B) and/or hydrocyanic acid (EPA 9010 B).

Flammability according to EPA method 1030, which corresponds to the displacement velocity of a flame performing the test under certain experimental conditions.

Corrosivity, test performed according to EPA 1110 A Method used to determine the corrosivity that a waste is capable of producing under certain conditions. The corrosion is determined over a steel sample.

The results, which are included completely in the annex, indicate for both cases that:

a) Organic TCLP: indicates that the benzene, carbon tetrachloride, chlorobenzene, chloroform, o-cresol, m-cresol, p-cresol, cresol, 2,4-D, 1,4-dichlorobenzene, 1,2-dichloroethane, 1,1-dichloroethylene, endrin, 2,4-dinitrotoluene, heptachlor and its epoxide, hexachlorobenzene, hexachlorobutadiene, hexachloroethane, lindane, metoxichlor, methyl ethyl ketone, nitrobenzene, pentachlorophenol, pyridine, tetrachloroethylene, toxaphene, trichloroethylene, 2,4,5-trichlorophenol, 2,4,6-trichlorophenol, 2,4,5-TP (Silbes) and vinyl chloride contents are under the Maximum Allowed Concentration (DS 148/04).

b) Inorganic TCLP Test: the lead, cadmium, mercury, chrome, barium, selenium, arsenic and silver contents are under the Maximum Allowed Concentration (DS 148/04).

c) Reactivity: the hydrocyanic acid and sulphydric acid contents are under the Maximum Allowed Concentration (DS 148/04).

d) Flammability: it does not ignite, in accordance with the Maximum Propagation Rate established by EPA 1030 expressed in mm/sec.

e) Corrosivity: under the Maximum Corrosive Rate established by EPA 1110 A expressed in mm/year.

The analyses performed by CESMEC in accordance with the DS 148/04 indicate that the DRUX isn't a dangerous result and that the contents and concentration of certain metals that can be leached in a natural way or migrate towards the groundwater or to the ocean water, in accordance with the environmental conditions of the storage place of a solid waste, not only are under the Maximum Concentrations allowed by the DS 148/04, but also are under the limits of detection of the instruments and methodologies indicated by EPA 1311, which are lower than those allowed by the DS 148/04.

A microbiological analysis that was performed determined that the Drux is inert regarding pathogen microbiological organisms (in Annex).

From the results of the analyses, it is concluded then, that the material resulting from this stage, the Drux, is inert regarding the microbiological pollution and the heavy metals. Not only are they under the EPA rule of United States of America, but also undetectable. The mesophyll funguses are innocuous and disappear once the block is covered with mortar cement or other waterproof The TI/RSW does not generate greenhouse gases, does not generate percolating liquids, neither does it leach heavy metals.

$2^{nd}$ Stage: Disposal on land. Use of drux as construction or final disposal material on land.

Disposal on land: if this is going to be used as filling material to modify the microgeography, the drux is directly set out in layers of up to 80 cm of height, leaving it to forge before setting out another layer and so on until reaching an elevation 1 meter lower than the level of the desired land level. Once this 1-elevation has been reached, it must be covered with a layer of soil of 1 meter of height, with characteristics similar to those of the environment in terms of composition, grain-size distribution and depth, so this new ground is harmoniously integrated to the habitat which is being modified.

Uses as construction material, the following as examples, not being this a limited listing:

Drux Uses:

Impact Absorbers, Road Dividers and Side Dikes

The impact absorbers are structures filled with Drux whose function in the roads, tracks, cities and public roadways is to protect the road or urban structures, such as traffic lights for example, and absorb the energy of the impact avoiding damages to the driver and to the vehicle.

The road dividers are known and built as a solid concrete block. They have the inconvenience that when the vehicle crushes into them, the vehicle is destroyed and the driver dies.

A divider built as a concrete or plastic mold and filled with Drux will cushion the knock to a large extent due to its elasticity.

A divider with these characteristics and 2 ms long requires 535 liters of Drux, ½ ton approximately that finally dry it will weigh approximately one fifth of a traditional one. In addition, the freight and installation costs are reduced. This use of Drux transforms the communal garbage in protectors of the citizens that live there.

Cycle Paths

Over a compacted ground, a layer of 10 cm of Drux is set out and over it, a layer of 2.5 cm of cement mortar. During the tests this structure perfectly supported the traffic of people and even of a light truck. It can be concluded from the field results that a RSW truck of 12 m$^3$ generates the Drux necessary in order to build 26 linear meters of a normal cycle path of 1.5 ms of width.

Blocks

The block that is made from the Drux is 19×19×39 cm. The concrete block is hollow (2 square holes) and quite solid. The block of Drux is solid and its weight is of the order of 25% of the concrete block, but weaker. It has weight advantages, much more lightweight, but weaker. It is useful for the construction of walls and other elements.

Panels

In the construction of the Panels the Drux replaces its filling material; the most used material is the expanded Polystyrene.

If the standard Panel model—0.60 m×2.2 m×0.2 m—is considered, it has an inferior volume of 158 liters, which is equivalent to a little more than ½ m$^3$ of garbage.

3$^{rd}$ Stage: Final disposal in the ocean.

The mortar is the element most usual for packaging the Drux before anchoring it into the ocean; using 20 to 25% of cement with 5 to 10% of commercial waterproof additives of latex type, bentonite, commercial products such as Sika or others.

Once the Drux blocks have hardened, they are coated with a layer of waterproofed mortar of 2 to 3 inches thick and once dry, anchored into the ocean. The commercial additives, bentonite or others may be used as waterproof for the cement mortar. This option is the most economically adequate for anchoring the RSW into the ocean.

Another option is to package them in a coating that may consist of materials resulting from or elaborated with epoxy resins, thick paving or other petroleum by-products.

The Drux packaged in cement mortar may be anchored down to 200 meters deep. At this depth the water column, since it is faced to the resistance of a continuous solid, hardened mixture coated with mortar, does not break up the cover of the mortar, behaving as another rock in the bottom.

The anchoring maneuver must be carefully performed in order not to break up the mortar and consider the ocean currents so that the blocks may arrive exactly to the chosen place.

This anchoring system has a positive effect over the ocean fauna, since it acts the same way as the experiences performed anchoring tires in the coasts of La Florida, USA. The blocks, the same as the tires, create a new shelter habitat for the ocean fauna, particularly when the chosen place is a sandy and flat bottom.

FACT ANALYSES ANNEXES PERFORMED BY CESMEC

TEST REPORT
SAB -36143

| | |
|---|---|
| Applicant : ASEVIN LTDA. | Work Order: 316.021 |
| Attention Mr. : José Alberto Ochoa | Issuance Date: 03.16.2005 |

BACKGROUND

A sample of Block composed of solid waste compressed and coated with concrete was received in our laboratories in order to be subject to Bacteriological Analysis, according to Work Application N° 102015.

DATE/TIME ENTRY  03.09.2005  TIME: 09:00 a.m.

DATE/TIME ANALYSIS BEGINNING  03.09.2005  TIME: 11:00 a.m.

DATE/TIME OBTENTION OF RESULTS 03.14.2005  TIME: 01:00 p.m.

METHODOLOGIES NCh 2659 Of 2002; NCh 2730 Of. 2002; NCh 2635/1 Of. 2001

NCh 2636 Of 2001; NCh 2675 Of. 2002; NCh 2734 Of. 2002

RESULTS  Once the analyses were performed, the results are the following:

| Parameter | Sample N° 105 |
|---|---|
| Salmonela Presence / Absence 50 g | Absent |
| Anaerobic Sulphite Reducers cfu/g | < 10 |
| Total Coliforms NMP/g | 3.6 |
| Fecal Coliforms NMP/g | < 3 |
| *Escherichia coli* NMP/g | < 3 |
| Aerobic Mesophiles Recount cfu/g | $9.9 \times 10^5$ |
| Fungus Recount cfu/g | $8.2 \times 10^4$ |
| Yeast Recount cfu/g | <10 |

Note: The results are valid only for the analyzed sample, which was provided by the applicant Olga Ureta B.
Department Chief Chemistry and Foods Division

CHEMICAL ANALYSIS REPORT
SQC -12718

| | | |
|---|---|---|
| Applicant | : ASEVIN LTDA. | Work Order: 316021 |
| Attention Mr. | : José Alberto Ochoa | Issuance Date: 03.16.2005 |
| Address | : Las Urbinas 53 – Providencia | |

1.- GENERAL BACKGROUND

Reception Date : 03/08/2005
Sample Quantity : Two (2)
Type of Samples : Solids
Provided by : ASEVIN Ltda., according the Sample Reception N° 13236
Analysis Ending Date: 03.16.2005

2.- TEST METHODS 2.1  NCh 2754 Of 2003 (Test TCLP – EPA 1311)

Waste – Leaching Procedure in order to determine mobility of organic and inorganic toxic analytes This rule is applied to the determination of the concentration of certain metals that may be leached in a natural way, according to the environmental conditions of the storage place of a solid waste.

This rule is applied to lands exposed and not exposed to massive waste o scraps; scraps or sediments, solid and/or liquid, coming form mining or industrial operations.

| TEST | METHOD | DETECTION LIMIT mg/l |
|---|---|---|
| Preparation and Extraction | EPA 1311 | – |
| Lead | Atomic Absorption | 0,2 |
| Cadmium | Atomic Absorption | 0,05 |
| Mercury | A.A./Cold Steam | 0,01 |
| Chromium | Atomic Absorption | 0,1 |
| Barium | Atomic Absorption | 5 |
| Selenium | Atomic Absorption | 0,2 |
| Arsenic | Atomic Absorption | 0,2 |
| Steal | Atomic Absorption | 0,2 |

SQC -12718
Issuance Date: 03.16.2005

2.2 Reactivity Characteristics:

Release of Sulphydric Acid and/or Hydrocyanic Acid. In general, this concept refers to a possible formation of Toxic compounds, as a result of chemical reactions among the components of the waste or as a result of the conditions to which it will be exposed.

| TEST | METHOD | DETECTION LIMIT Mg/kg |
|---|---|---|
| Sulphydric Acid | EPA 1002 | 10 |

3.- SAMPLE IDENTIFICATION

M-1: Special Brick 104

Block sample composed of solid waste compressed and coated with concrete

4.- RESULTS

4.1.- TCLP Test

| ELEMENT | M-1 mg/l | Maximum Allowed Concentration EPA 1311 mg/l |
|---|---|---|
| Lead | <0.2 | 5,0 |
| Cadmium | <0.05 | 1,0 |
| Mercury | <0.01 | 0,2 |
| Chromium | <0.1 | 5,0 |
| Barium | <5 | 100,0 |
| Selenium | <0.2 | 1,0 |
| Arsenic | <0.2 | 5,0 |
| Steal | <0.2 | 5,0 |

SQC -12718
Issuance Date: 03.16.2005

4.2 Reactivity

| TEST | M-1 mg/kg | Maximum Allowed Concentration EPA 1002 mg/kg |
|---|---|---|
| Sulphydric Acid | <5 | 500 |

NOTE 1: The Tests were performed only in the inside of the brick sample, pursuant to what was agreed with the applicant.

NOTE 2: The results obtained are valid only for the tested samples, which were provided and identified by the applicant.

MONICA DIAZ BADILLO
Chemistry and Minerals Department Chief
Chemical Analysis Division

CHEMICAL ANALYSIS REPORT
SQC -13795

| | | | |
|---|---|---|---|
| Applicant | : ASEVIN LTDA. | Work Order: | 316021 |
| Attention Mr. | : José Alberto Ochoa | Issuance Date: | 01.30.2006 |
| Address | : Las Urbinas 53 – Providencia | | |

1.- GENERAL BACKGROUND

Reception Date : 01.11.2005
Sample Quantity : One (1)
Type of Samples : Brick
Provided by : ASEVIN Ltda., according the Sample Reception N° 7917
Analysis Ending Date: 01.30.2006

2.- TEST METHODS

3.- Characteristic Toxicity Elements (Organic Compounds) TEST TCLP

These compounds are determined through the technique of Gas Chromatography with FID and Electronic Capture detector.

| ELEMENT | DETECTION LIMIT Mg/l | ELEMENT | DETECTION LIMIT Mg/l |
|---|---|---|---|
| Benzene | <0,5 | Hexachlorobenzene | <0,1 |
| Carbon Tetrachloride | <0,1 | Hexachlorobutadiene | <0,5 |
| Chlordane | <0,02 | Hexachloroethane | <1 |
| Chlorobenzene | <5 | Lindane | <0,02 |
| Chloroform | <2 | Metoxichlor | <0,5 |
| o-cresol | <5 | Methyl ethyl ketone | <5 |
| m-cresol | <5 | Nitrobenzene | <2 |
| p-cresol | <5 | Pentachlorophenol | <25 |
| Cresol | <5 | Pyridine | <5 |
| 2,4 – D | <1 | Tetrachloroethylene | <0,5 |
| 1, 4- Dichlorobenzene | <5 | Toxaphene | <0,5 |
| 1,2-Dichloroethane | <0,5 | Trichloroethylene | <0,5 |
| 1,1-Dichloroethylene | <0,5 | 2,4,5-trichlorophenol | <50 |
| Endrine | <0,02 | 2,4,6-trichlorophenol | <2,0 |
| 2,4-Dinitrotoluene | <0,13 | 2,4,5-TP (silvex) | <1,0 |
| Heptachlor (and its epoxide) | <0,005 | Vinyl Chloride | <0,1 |

SQC -13795
Issuance Date: 01.30.2006

3.2    NCh 2754. Of 2003 (Test TCLP – EPA 1311)

Waste – Leaching Procedure in order to determine mobility of organic and inorganic toxic analytes.

This rule is applied to the determination of the concentration of certain metals that may be leached in a natural way, according to the environmental conditions of the storage place of a solid waste.

This rule is applied to lands exposed and not exposed to massive waste o scraps; scraps or sediments, solid and/or liquid, coming form mining or industrial operations.

| TEST | METHOD | DETECTION LIMIT mg/l |
|---|---|---|
| Preparation and Extraction | NCh 2754 | – |
| Lead | Atomic Absorption | 0,2 |
| Cadmium | Atomic Absorption | 0,05 |
| Mercury | A.A./Cold Steam | 0,01 |
| Chromium | Atomic Absorption | 0,1 |
| Barium | Atomic Absorption | 5 |
| Selenium | Atomic Absorption / Hydrides Generation | 0,05 |
| Arsenic | Atomic Absorption | 0,2 |
| Steal | Atomic Absorption | 0,2 |

3.3    Reactivity:

Release of Sulphydric Acid and/or Hydrocyanic Acid. In general, this concept refers to a possible formation of Toxic compounds, as a result of chemical reactions among the components of the Waste or as a result of the conditions to which it will be exposed.

| TEST | METHOD | DETECTION LIMIT mg/kg |
|---|---|---|
| Hydrocyanic Acid | EPA 9010B | 0,5 |
| Sulphydric Acid | EPA 9030B | 10 |

3.4-    Flammability

Should the sample contain flammable liquids, the test is performed according to EPA 1010 method, which is based on the determination of the temperature (°C) to which the waste becomes inflamed, using for these purposes the "Pensky Martens" system of closed cup. For the case in which the sample corresponds to a solid, the flammability concept corresponds to the displacement velocity of a flame, performing the test under certain experimental conditions (EPA 1030).

SQC -13795
Issuance Date: 01.30.2006

3.5  Corrosivity

Test performed according to EPA 1110A Method. This method is used to determining the corrosivity that a scrap is capable of producing under certain conditions. The corrosion is determined over a sample of steel.

4.  SAMPLE IDENTIFICATION

M-1 Brick

5.  RESULTS 5.1.  Inorganic TCLP Test

| ELEMENT | M-1<br>mg/l | MAC*<br>D.S. 148<br>mg/l |
|---|---|---|
| Lead | <0.2 | 5.0 |
| Cadmium | <0.05 | 1.0 |
| Mercury | <0.01 | 0.2 |
| Chromium | <0.1 | 5.0 |
| Barium | <5 | 100.0 |
| Selenium | <0.05 | 1.0 |
| Arsenic | <0.2 | 5.0 |
| Steal | <0.2 | 5.0 |

(*) MCA: Maximum Allowed Concentration

SQC -13795
Issuance Date: 01.30.2006

5.2.- Organic TCLP

| ELEMENT | Sample M-1 mg/l | MAXIMUM CONCNENTRATION D.S. 148 mg/l |
|---|---|---|
| Benzene | <0,5 | 0,5 |
| Carbon Tetrachloride | <0,1 | 0,5 |
| Chlordane | <0,02 | 0,03 |
| Chlorobenzene | <5 | 100 |
| Chloroform | <2 | 6 |
| o-cresol | <5 | 200 |
| m-cresol | <5 | 200 |
| p-cresol | <5 | 200 |
| Cresol | <5 | 200 |
| 2,4 – D | <1 | 10 |
| 1, 4- Dichlorobenzene | <5 | 7,5 |
| 1,2-Dichloroethane | <0,5 | 0,5 |
| 1,1-Dichloroethylene | <0,5 | 0.7 |
| Endrine | <0,02 | 0,02 |
| 2,4-Dinitrotoluene | <0,13 | 0,13 |
| Heptachlor (and its epoxide) | <0,005 | 0,008 |
| Hexachlorobenzene | <0,1 | 0,13 |
| Hexachlorobutadiene | <0,5 | 0,5 |
| Hexachloroethane | <1 | 3 |
| Lindane | <0,02 | 0,4 |
| Metoxichlor | <0,5 | 10 |
| Methyl ethyl ketone | <5 | 200 |
| Nitrobenzene | <2 | 2 |
| Pentachlorophenol | <25 | 100 |
| Pyridine | <5 | 5,0 |
| Tetrachloroethylene | <0,5 | 0,7 |
| Toxaphene | <0,5 | 0,5 |
| Trichloroethylene | <0,5 | 0,5 |
| 2,4,5-trichlorophenol | <50 | 400 |
| 2,4,6-trichlorophenol | <2,0 | 2 |
| 2,4,5-TP (silvex) | <1,0 | 1 |
| Vinyl Chloride | <0,1 | 0,2 |

SQC -13795
Issuance Date: 01.30.2006

5.3.- Reactivity

| TEST | M-1<br>mg/kg | MAXIMUM ALLOWED CONCNENTRATION<br>EPA 9010B / 9030B<br>mg/kg |
|---|---|---|
| Hydrocyanic Acid (EPA-9010B) | <0,5 | 250 |
| Sulphydric Acid (EPA-9030B) | 181 | 500 |

5.4.- Flammability

| TEST | Displacement Velocity of a Flame<br>mm/s | Maximum Displacement Rate<br>EPA 1030<br>mm/s |
|---|---|---|
| Flammability | Does not Ignate | 2,2 |

5.5.- Corrosivity

| TEST | M-1<br>mm/year | Maximum Corrosion Rate<br>EPA 1110-A<br>mm/year |
|---|---|---|
| Corrosivity | 0.15 | 6,35 |

NOTE: The results obtained are valid only for the samples analyzed which were provided and identified by the applicant.

MONICA DIAZ BADILLO
Chief Department Chemistry and Minerals

CHEMICAL ANALYSIS REPORT
SQC -13794

| | | | |
|---|---|---|---|
| Applicant | : ASEVIN LTDA. | Work Order: | 316021 |
| Attention Mr. | : José Alberto Ochoa | Issuance Date: | 01.30.2006 |
| Address | : Las Urbinas 53 – Providencia | | |

1.- GENERAL BACKGROUND

Reception Date : 01.11.2005
Sample Quantity : One (1)
Type of Samples : Brick
Provided by : ASEVIN Ltda., according the Sample Reception N° 7896
Analysis Ending Date: 01.30.2006

2.- TEST METHODS

3.- Characteristic Toxicity Elements (Organic Compounds) TEST TCLP

These compounds are determined through the technique of Gas Chromatography with FID and Electronic Capture detector.

| ELEMENT | DETECTION LIMIT mg/l | ELEMENT | DETECTION LIMIT mg/l |
|---|---|---|---|
| Benzene | <0,5 | Hexachlorobenzene | <0,1 |
| Carbon Tetrachloride | <0,1 | Hexachlorobutadiene | <0,5 |
| Chlordane | <0,02 | Hexachloroethane | <1 |
| Chlorobenzene | <5 | Lindane | <0,02 |
| Chloroform | <2 | Metoxichlor | <0,5 |
| o-cresol | <5 | Methyl ethyl ketone | <5 |
| m-cresol | <5 | Nitrobenzene | <2 |
| p-cresol | <5 | Pentachlorophenol | <25 |
| Cresol | <5 | Pyridine | <5 |
| 2,4 – D | <1 | Tetrachloroethylene | <0,5 |
| 1, 4- Dichlorobenzene | <5 | Toxaphene | <0,5 |
| 1,2-Dichloroethane | <0,5 | Trichloroethylene | <0,5 |
| 1,1-Dichloroethylene | <0,5 | 2,4,5-trichlorophenol | <50 |
| Endrine | <0,02 | 2,4,6-trichlorophenol | <2,0 |
| 2,4-Dinitrotoluene | <0,13 | 2,4,5-TP (silvex) | <1,0 |
| Heptachlor (and its epoxide) | <0,005 | Vinyl Chloride | <0,1 |

SQC -13794
Issuance Date: 01.30.2006

3.2.- NCh 2754. Of 2003 (Test TCLP – EPA 1311)

Waste – Leaching Procedure in order to determine mobility of organic and inorganic toxic analytes.

This rule is applied to the determination of the concentration of certain metals that may be leached in a natural way, according to the environmental conditions of the storage place of a solid waste.

This rule is applied to lands exposed and not exposed to massive waste o scraps; scraps or sediments, solid and/or liquid, coming form mining or industrial operations.

| TEST | METHOD | DETECTION LIMIT mg/l |
|---|---|---|
| Preparation and Extraction | NCh 2754 | – |
| Lead | Atomic Absorption | 0,2 |
| Cadmium | Atomic Absorption | 0,05 |
| Mercury | A.A./Cold Steam | 0,01 |
| Chromium | Atomic Absorption | 0,1 |
| Barium | Atomic Absorption | 5 |
| Selenium | Atomic Absorption / Hydrides Generation | 0,05 |
| Arsenic | Atomic Absorption | 0,2 |
| Steal | Atomic Absorption | 0,2 |

3.3.- Reactivity

Release of Sulphydric Acid and/or Hydrocyanic Acid. In general, this concept refers to a possible formation of Toxic compounds, as a result of chemical reactions among the components of the Waste or as a result of the conditions to which it will be exposed.

| TEST | METHOD | DETECTION LIMIT mg/kg |
|---|---|---|
| Hydrocyanic Acid | EPA 9010B | 0,5 |
| Sulphydric Acid | EPA 9030B | 10 |

3.4.- Flammability

Should the sample contain flammable liquids, the test is performed according to EPA 1010 method, which is based on the determination of the temperature (°C) to which the waste becomes inflamed, using for these purposes the "Pensky Martens" system of closed cup. For the case in which the sample corresponds to a solid, the flammability concept corresponds to the displacement velocity of a flame, performing the test under certain experimental conditions (EPA 1030).

SQC -13794
Issuance Date: 01.30.2006

3.5.- Corrosivity

Test performed according to EPA 1110A Method. This method is used to determining the corrosivity that a scrap is capable of producing under certain conditions. The corrosion is determined over a sample of steel.

4.- SAMPLE IDENTIFICATION

M-1 Brick

5.- RESULTS 5.1. Inorganic TCLP Test

| ELEMENT | M-1<br>mg/l | MAC*<br>D.S. 148<br>mg/l |
|---|---|---|
| Lead | <0.2 | 5.0 |
| Cadmium | <0.05 | 1.0 |
| Mercury | <0.01 | 0.2 |
| Chromium | <0.1 | 5.0 |
| Barium | <5 | 100.0 |
| Selenium | <0.05 | 1.0 |
| Arsenic | <0.2 | 5.0 |
| Steal | <0.2 | 5.0 |

(*) MCA: Maximum Allowed Concentration.

SQC -13794
Issuance Date: 01.30.2006

5.2.- Organic TCLP

| ELEMENT | Sample M-1 mg/l | MAXIMUM CONCNENTRATION D.S. 148 mg/l |
|---|---|---|
| Benzene | <0,5 | 0,5 |
| Carbon Tetrachloride | <0,1 | 0,5 |
| Chlordane | <0,02 | 0,03 |
| Chlorobenzene | <5 | 100 |
| Chloroform | <2 | 6 |
| o-cresol | <5 | 200 |
| m-cresol | <5 | 200 |
| p-cresol | <5 | 200 |
| Cresol | <5 | 200 |
| 2,4 – D | <1 | 10 |
| 1, 4- Dichlorobenzene | <5 | 7,5 |
| 1,2-Dichloroethane | <0,5 | 0,5 |
| 1,1-Dichloroethylene | <0,5 | 0.7 |
| Endrine | <0,02 | 0,02 |
| 2,4-Dinitrotoluene | <0,13 | 0,13 |
| Heptachlor (and its epoxide) | <0,005 | 0,008 |
| Hexachlorobenzene | <0,1 | 0,13 |
| Hexachlorobutadiene | <0,5 | 0,5 |
| Hexachloroethane | <1 | 3 |
| Lindane | <0,02 | 0,4 |
| Metoxichlor | <0,5 | 10 |
| Methyl ethyl ketone | <5 | 200 |
| Nitrobenzene | <2 | 2 |
| Pentachlorophenol | <25 | 100 |
| Pyridine | <5 | 5,0 |
| Tetrachloroethylene | <0,5 | 0,7 |
| Toxaphene | <0,5 | 0,5 |
| Trichloroethylene | <0,5 | 0,5 |
| 2,4,5-trichlorophenol | <50 | 400 |
| 2,4,6-trichlorophenol | <2,0 | 2 |
| 2,4,5-TP (silvex) | <1,0 | 1 |
| Vinyl Chloride | <0,1 | 0,2 |

SQC -13794
Issuance Date: 01.30.2006

5.3.- Reactivity

| TEST | M-1<br>mg/kg | MAXIMUM ALLOWED CONCNENTRATION<br>EPA 9010B / 9030B<br>mg/kg |
|---|---|---|
| Hydrocyanic Acid (EPA-9010B) | <0,5 | 250 |
| Sulphydric Acid (EPA-9030B) | 181 | 500 |

5.4.- Flammability

| TEST | Displacement Velocity of a Flame<br>mm/s | Maximum Displacement Rate<br>EPA 1030<br>mm/s |
|---|---|---|
| Flammability | Does not Ignite | 2,2 |

5.5.- Corrosivity

| TEST | M-1<br>mm/year | Maximum Corrosion Rate<br>EPA 1110-A<br>mm/year |
|---|---|---|
| Corrosivity | 0.23 | 6,35 |

NOTE: The results obtained are valid only for the samples analyzed which were provided and identified by the applicant.

MONICA DIAZ BADILLO
Chief Department Chemistry and Minerals

The invention claimed is:

1. A process for the permanent disposal of a residential solid waste, the process comprising the steps of:
   a) milling the residential solid waste into a particulate mass;
   b) homogenizing the particulate mass of the residential solid waste;
   c) sanitizing the particulate mass of the residential solid waste;
   d) stabilizing the particulate mass of the residential solid waste with the addition of a stabilizing binder and hardener;
   e) adding a water to the particulate mass of the residential solid waste to facilitate a mixing of the particulate mass with the stabilizing binder and hardener;
   e) molding the particulate mass of the residential solid waste into a molded mass; and
   f) drying the molded mass to form an inert product.

2. The process of claim 1, wherein the step of milling the residential solid waste includes processing the residential solid waste in a rotating mill, the rotating mill having sieves that generate particles of the particulate mass from 2 mm to 25 mm in size.

3. The process of claim 1, wherein the step of sanitizing the particulate mass includes a sanitization process selected from a group of sanitization processes consisting of: ultraviolet radiation, ozonification, chlorination, or oxygenated water addition.

4. The process of claim 1, wherein the step of stabilizing the particulate mass of the residential solid waste with the addition of a stabilizing binder and hardener includes adding a stabilizing binder and hardener selected from a group consisting of: calcium hydroxide, quicklime, calcium carbonate, calcium hydroxide, cement, plaster, or bentonite.

5. The process of claim 1, wherein the step of stabilizing the particulate mass with the stabilizing binder and hardener prevents a percolating of liquids from the particulate mass.

6. The process of claim 1, wherein the step of stabilizing the particulate mass with the stabilizing binder and hardener prevents a leaching of heavy metals from the particulate mass.

7. The process of claim 1, wherein the step of stabilizing the particulate mass with the stabilizing binder and hardener prevents a generation of greenhouse gases from the particulate. mass.

8. The process of claim 1, wherein the step of sanitizing the particulate mass prevents a proliferation of a bacteria within the particulate mass.

9. The process of claim 1, wherein the step of sanitizing the particulate mass prevents a proliferation of a microorganism within the particulate mass.

10. The process of claim 1, additionally including the steps of:
    g) coating the inert product with a layer of waterproof material; and
    h) disposing the inert product onto an ocean bottom.

11. The process of claim 10, wherein step coating the inert product with a layer of waterproof material includes coating the inert product with a layer of a waterproof mortar having a thickness of 2 inches to 3 inches.

12. The process of claim 10, wherein step coating the inert product with a layer of waterproof material includes coating the inert product with a layer of an epoxy resin.

* * * * *